(12) United States Patent
Yoon et al.

(10) Patent No.: US 6,345,185 B1
(45) Date of Patent: Feb. 5, 2002

(54) METHOD FOR TRANSMITTING A PSMM IN A COMMUNICATION SYSTEM

(75) Inventors: Ja Hyeok Yoon, Kyungki-do; Hyun Goo Lee, Seoul; Sung Hyuck Hong, Kyungki-do; Sang Yoon Han, Seoul, all of (KR)

(73) Assignee: LG Information and Communications, Ltd., Seoul (KR)

( * ) Notice: Subject to any disclaimer, the term of this patent is extended or adjusted under 35 U.S.C. 154(b) by 0 days.

(21) Appl. No.: 09/223,731

(22) Filed: Dec. 31, 1998

(30) Foreign Application Priority Data

Aug. 14, 1998 (KR) .......................................... 98/33373

(51) Int. Cl.⁷ ................................................ H04Q 7/20
(52) U.S. Cl. ........................ 455/436; 455/442; 370/332
(58) Field of Search ................................ 455/436, 437, 455/442, 423, 9, 67.1, 522; 370/332; 375/130

(56) References Cited

U.S. PATENT DOCUMENTS

| | | | | | |
|---|---|---|---|---|---|
| 5,854,785 A | * | 12/1998 | Willey | ......................... | 370/332 |
| 5,920,550 A | * | 7/1999 | Willey | ......................... | 370/332 |
| 6,049,716 A | * | 4/2000 | Jung | ......................... | 455/442 |
| 6,075,990 A | * | 6/2000 | Shin | ......................... | 455/440 |

* cited by examiner

Primary Examiner—Dwayne Bost
Assistant Examiner—Erika A. Gary
(74) Attorney, Agent, or Firm—Fleshner & Kim, LLP

(57) ABSTRACT

An improved method for effectively transmitting a PSMM in a communication system is provided. According to the present invention, a mobile station decides whether s message generated in itself is a PSMM. If the message is the PSMM, the mobile station decides whether the PSMM is the most recent PSMM. If the PSMM is not the most recent PSMM, the mobile station waits until the most recent PSMM is generated. If the PSMM is the most recent PSMM, the mobile station transmits only the most recent PSMM to the base station in order to gain an acknowledgment from the base station.

30 Claims, 5 Drawing Sheets

| Terminal | | | | Base station | | | |
|---|---|---|---|---|---|---|---|
| Ack Waiting (Winow Index) | Intialization | Ack. Status1 | Ack. Status2 | Ack Waiting (Winow Index) | Intialization | Ack. Status1 | Ack. Status2 |
| W0 | No | Yes→No | Yes→No | W0 | No | Yes→No | Yes→No |
| W1 | No | Yes→No | Yes→No | W1 | No | Yes→No | Yes→No |
| W2 | No | Yes→No | Yes→No | W2 | No | Yes | Yes→No |
| W3 | No | No | Yes→No | W3 | No | | Yes |
| W4 | No | No | Yes | W4 | No | No | No |
| W5 | No | No | | W5 | No | No | No |
| W6 | No | No | | W6 | No | No→No | No |
| W7 | No | No | | W7 | No | No→No | No→No |

FIG.6

METHOD FOR TRANSMITTING A PSMM IN A COMMUNICATION SYSTEM

BACKGROUND OF THE INVENTION

1. Field of Invention

The present invention relates to a mobile communication system, more particularly, to an improved method for transmitting a pilot strength measurement message (PSMM) in a mobile communication system.

2. Background of the Related Art

A handoff is a technique that when a mobile station in communicating moves from a current cell to a neighbor cell in a single communication system, the communication path is automatically changed and the communication maintains its continuity. The handoffs are classified into a soft handoff, a softer handoff and a hard handoff.

The soft handoff and the softer handoff make it possible that the mobile station maintains the continuity of the communication with a new base station (or sector) that uses the same frequency as a previous base station (or sector). The hard handoff is a technique that is used in the base stations having different frequencies or having different frame offsets and is used to make the communication without being interrupted when the mobile station moves in many base stations in which the soft handoff is not possible.

Figure 1:
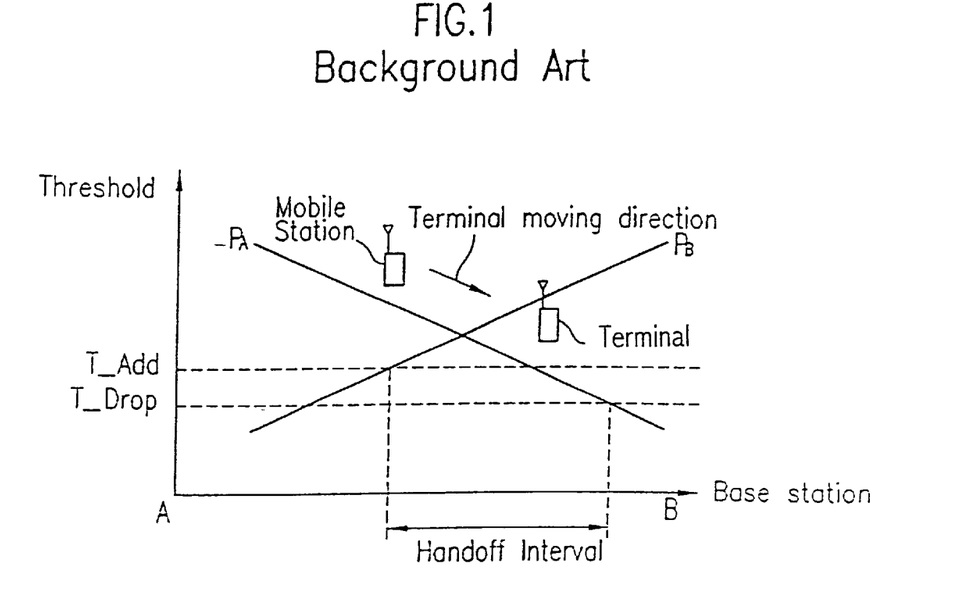
FIG. 1 is a diagram showing a general process for the mobile station between two base stations to establish a base station according to the pilot strength threshold value.

Of the handoff methods, the soft handoff is explained in detail by referring to FIG. 1.

FIG. 1 is a diagram showing the process that a mobile station establishes a base station according to a pilot strength threshold value.

As shown in FIG. 1, when a mobile station is between two base stations A and B and its pilot strength is on the upper threshold value (T_ADD), the mobile station makes the communication through the base station A. However, if the threshold strength is on the lower threshold value (T_DROP), the mobile station makes the communication through the base station B.

On the other hand, if the mobile station is in moving from the base station A to the base station B, the mobile station passes the handoff interval in which its communication is not interrupted. Then, the mobile station has to make the communication through both base station A and base station B. However, when the mobile station is on the lower threshold value (T_DROP), the communication channel of the mobile station through the base station A is disconnected and at the same time the communication of the mobile station is achieved only through the base station B.

Figure 2:
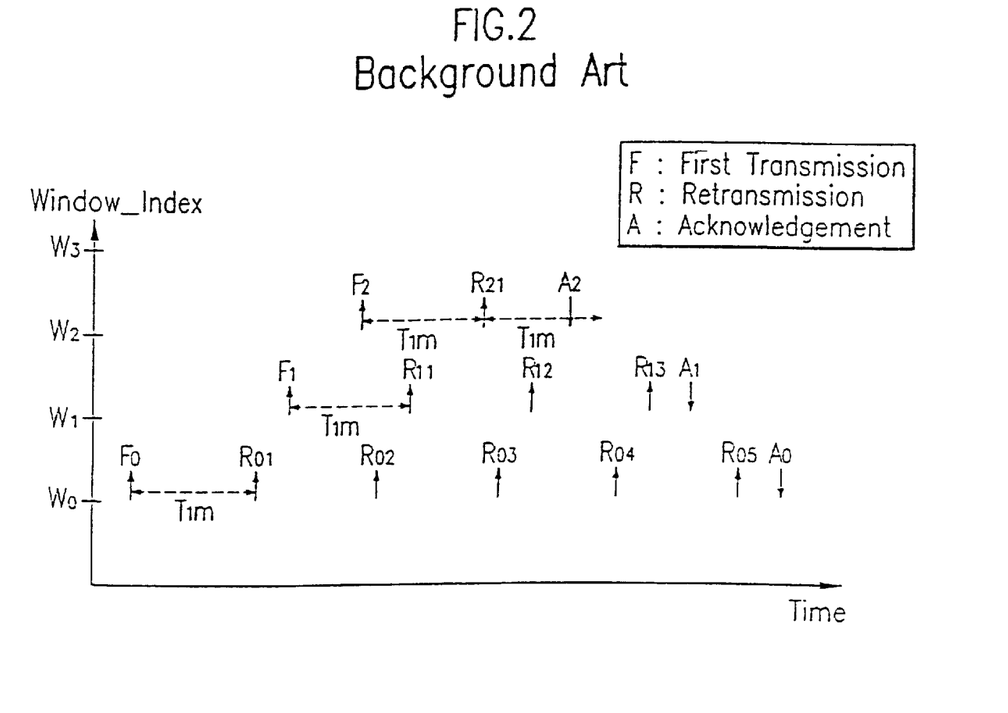
FIG. 2 is a diagram showing the process for the mobile station to transmit the PSMM to a base station until an acknowledgment is gained according to a conventional method.

FIG. 2 is a diagram showing the process in which the pilot strength measurement and retransmission are achieved according to the conventional method.

FIG. 2 shows the acknowledgment process of the base station for the PSMM according to the existing IS-95B and J-STD-008 standard rules.

As shown in FIG. 1, FIG. 2 shows the process in which when the mobile station selects one of the two neighbor base stations according to the pilot strength threshold value, the mobile station generates the PSMM and transmits the PSMM.

First, for a PSMM requesting an acknowledgment, the mobile station establishes a message sequence number (MSG_SEQ) and an acknowledgment required indicator (ACK_REQ) and transmits the PSMM to the corresponding base station through a reverse traffic channel. The mobile station stores the message sequence number (MSG_SEQ) corresponding to the PSMM requesting the acknowledgment in a MSG_SEQ_ACKs and stores acknowledgment status indicators (ACK_WAITINGs[n], $0 \leq n \leq 7$). If the logic value of ACK_WAITINGs[(MSG_SEQ_ACKs+4) mod8] is YES, the mobile station does not transmit a new message requesting a response. Thus, when a new PSMM is transmitted to the base station through the reverse traffic channel, the mobile station sets ACK_WAITINGs[MSG_SEQ_ACKs] of the PSMM with YES and stores them. After then, when the acknowledgment for the PSMM is received from the base station through the forward traffic channel, ACK_WAITINGs[ACK_SEQ] for the transmitted PSMM is set with NO. At this time, the base station makes a response by setting the value of ACK_SEQ field into MSG_SEQ of the received message and by transmitting it.

On the other hand, the total window index number of a mobile station defined in IS-95B and J-STD-008 is 8 (0–7). Among them, the simultaneously transmittable number of the acknowledgment requesting messages (PSMM) before a response for the first message among them is received and the number (n) of the ACK_WAITING[n] cannot exceed 4. If the number of ACK_WAITINGs[n] exceeds 4, the mobile station does not transmit an acknowledgment requesting new message (PSMM) to the base station. As aforementioned, when an acknowledgment is received from the base station through the forward communication channel, the value of ACK_WAITINGs[ACK_SEQ] of the PSMM is NO. When a new PSMM requesting an acknowledgment is transmitted to the base station, the value of ACK_WAITINGs[MSG_SEQ_ACKs] of the mobile station is set with YES.

After the mobile station transmits the acknowledgment requesting PSMM to the base station, the mobile station drives a timer for time ($T_{1m}$). If the mobile station does not gain the acknowledgment from the base station until the time ($T_{1m}$) is passed, the mobile station retransmits the PSMM that has the identical message sequence number (MSG_SEQ) to the base station. At this time, whenever the mobile station retransmits the corresponding PSMM, the number of retransmissions, that is a retry count number, (RETRY_COUNT Number) is stored. If the retry count number exceeds the maximum value ($N_{1m}$), the mobile station declares the corresponding call drop.

When the mobile station moves, in order to establish a base station according to the pilot strength threshold value, the mobile station generates the first PSMM (F0) and then transmits the first PSMM to the base station. After transmitting the acknowledgment requesting first PSMM, the mobile station drives a timer for time ($T_{1m}$). The time for this case is 400 ms.

If the mobile station does not gain the acknowledgment from the base station until the time ($T_{1m}$) is passed, the mobile station retransmits the PSMM (R01) that has the identical message sequence number (MSG_SEQ) to the base station. The maximum number of the retransmissions is 13 as aforementioned.

When the mobile station keeps moving, in order to establish a new base station according to a new pilot strength threshold value, the mobile station generates a second PSMM (F1) and then transmits the acknowledgment requesting PSMM (F1) to the base station. After transmitting the acknowledgment requesting second PSMM (F1), the mobile station drives the timer for the time ($T_{1m}$) and waits the acknowledgment of the base station. If the mobile station does not gain the acknowledgment from the base station until the time ($T_{1m}$) is passed, the mobile station retransmits the PSMM (R11) that has the identical message sequence number (MSG_SEQ[1]) to the base station.

When the mobile station keeps moving in succession, in order to establish a new base station according to a new pilot strength threshold value, the mobile station may generate a third PSMM (F2). The third PSMM (F2) requests an acknowledgment and at the same time is transmitted to the base station. After transmitting the acknowledgment requesting third PSMM (F2) the mobile station drives the timer for the time ($T_{1m}$=400 ms). If the mobile station does not gain the acknowledgment from the base station until the time ($T_{1m}$=400 ms) is passed, the mobile station retransmits the PSMM (R21) that has the identical message sequence number (MSG_SEQ[2]) to the base station.

On the other hand, if the retransmitted PSMM (R01) that has the same message sequence number (MSG_SEQ[0]) as the acknowledgment requesting first PSMM (F0) does not gain an acknowledgment, a PSMM (R02) that has the identical message sequence number (MSG_SEQ[0]) is retransmitted to the base station.

After retransmitting the acknowledgment requesting third PSMM (R21) that has the same message sequence number (MSG_SEQ[2]), if the acknowledgement (A2) for the retransmitted PSMM (R21) is gained from the base station, the mobile station does not retransmit an acknowledgment requesting PSMM that has the same message sequence number (MSG_SEQ[2]) as the third PSMM (F2) to the base station any more.

However, as shown in FIG. 2, the first and second acknowledgment requesting PSMMs (F0, F1) are retransmitted by 5 and 3 times and then gain the acknowledgments (A0, A1), respectively. As the result, the retransmission of the PSMMs (R) having the same message sequence numbers as the PSMMs (F0, F1), respectively, is ceased.

As aforementioned, the mobile station has a limitation in retransmitting a PSMM. In other words the maximum retry count number ($N_{1m}$) for retransmitting is limited. If a retry count number exceeds the maximum retry count number ($N_{1m}$), the mobile station declares the call drop. Therefore, the mobile station fails in a handoff and returns to a call release.

On the other hand, whenever the mobile station exceeds the pilot strength threshold value, the PSMM is generated in succession. As far as each generated PSMM does not gain an acknowledgment from the base station, the PSMMs having the identical message sequence number (MSG_SEQ[n]) are retransmitted successively to the times of the maximum retry count number ($N_{1m}$) to the base station.

The method described above is called a selective repeat scheme. This scheme makes the message exchange between a mobile station and a base station possible, but has the following problem.

According to the scheme, as described in FIG. 2, the PSMM may be retransmitted unnecessarily many times. In other words, whenever a new PSMM having a strength exceeding a threshold value (T_Add) is generated as the mobile station moves, the PSMM (R) is retransmitted until an acknowledgment is received from the base station, but the number of the retransmissions is limited to the maximum retry Count number ($N_{1m}$). However, the most recently transmitted PSMM (for example, F2 and R21 in FIG. 2) is an effective message and all the previously transmitted PSMMs (F0, F1) are meaningless since the mobile station has been moved to a different place and therefore a new PSMM is generated.

Thus, the conventional PSMM transmitting method includes the unnecessary communication elements that a single PSMM is repeatedly retransmitted until an acknowledgment is gained.

Furthermore, under the current situation that the window size of the mobile station is 4, the ineffective utility of window may be caused.

The other problem is that the exact transmission is disturbed because of a continuous interference from the voice band signals.

The other problem is that the reliability is decreased since the call drop occurs when a retry count number exceeds the maximum retry count number ($N_{1m}$).

SUMMARY OF THE INVENTION

Accordingly, the present invention is directed to provide an improved PSMM transmission method in a communication system, by which the old PSMMs are prohibited from being retransmitted unnecessarily.

Another object of the present invention is to provide an improved PSMM transmission method in a communication system which has a backward compatibility and the existing IS-95B and J-STD-008.

To achieve this and other advantages and in accordance with the purpose of the present invention, as embodied and broadly described, the improved PSMM transmission method according to the present invention transmits the most recent PSMM among the PSMMs being successively generated to a base station and when the pre-generated other PSMMs manage the window indexes of the definite number of mobile stations and base stations or a new PSMM is generated, clears the states from the window indexes.

According to one embodiment of the present invention, the mobile station decides whether the generated message itself is the PSMM. If the message is the PSMM, then the mobile station decides whether the PSMM is the most recent PSMM. If the message is not the most recent one, the mobile station waits the most recent PSMM. If the message is the most recent one, to gain an acknowledgment, the mobile station transmits the most recent PSMM to the base station. If the mobile station does not gain the acknowledgment from the base station in response to the transmission, the mobile station retransmits the PSMM to the base station to the times of a maximum retry count number until the acknowledgment is gained. On the other hand, if the mobile station gains the acknowledgment from the base station in response to the transmission, the mobile station clears all the PSMMs including the most recent PSMM. Furthermore, in the present invention, the base station as well as the mobile station has the same window index and manages the PSMM transmission and acknowledgment. As aforementioned, according to the present invention, the unnecessary retransmission of the PSMMs is prohibited and therefrom the efficiency and the reliability of the communication system are improved.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Figure 3:
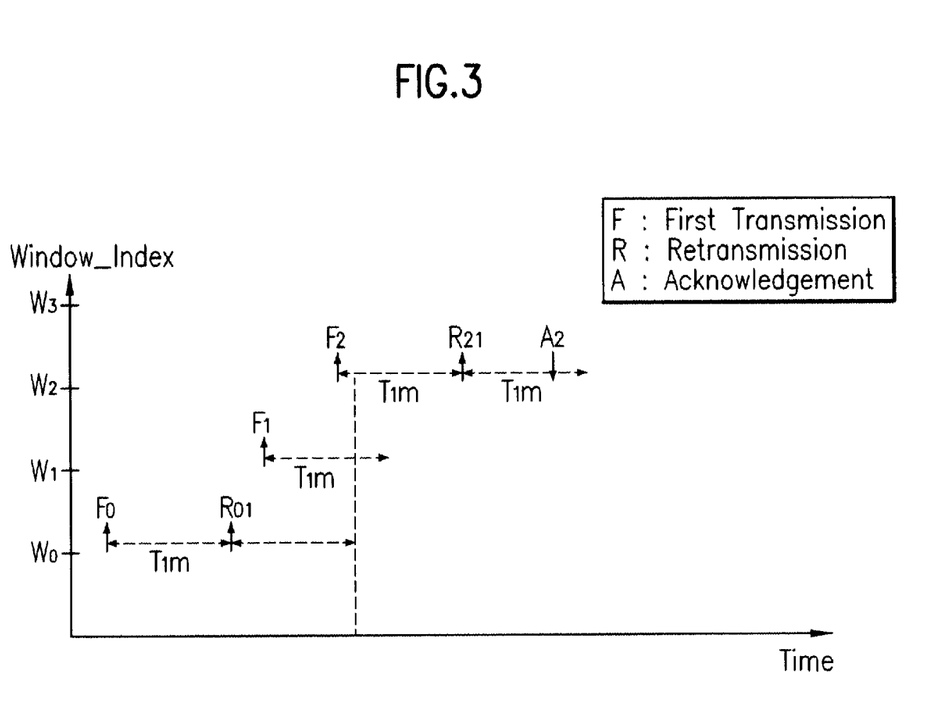
FIG. 3 is a diagram showing the process for the mobile station to transmit the PSMM to a base station until an acknowledgment is gained according to the present invention.

FIG. 3 shows the process that the mobile station transmits the PSMM to the base station until the acknowledgment is gained from the base station. In FIG. 3, the window index means the acknowledgment status indicator (ACK_WAITINGs[n]), where $0 \leq n \leq 7$.

In the standard protocol IS-95B and J-SJD-008 of CDMA communication system, MSG_SEQ number is 0 to 7. Therefore, the window index is 0 to 7. The number of messages being transmitted prior to receiving an acknowledgment in response to the first message, that is the number of windows, is 4.

As shown in FIG. 3, if the mobile station moves between two base stations, the mobile station generates a first PSMM in order to establish one base station of the two base stations according to the pilot strength threshold value measured by itself. This PSMM is the acknowledgment requesting message (F0) that requests one of the two base stations an acknowledgment. After transmitting the message (F0) to the two base stations, the mobile station drives the timer for the time ($T_{1m}$). For this case, $T_{1m}$ is set with 400 ms.

If the acknowledgment is not gained until the time ($T_{1m}$) is passed, the mobile station retransmits the message (R01) having the identical message sequence (MSG_SEQ) to the base stations.

As the mobile station moves, the mobile station generates a second new PSMM (F1) that requests an acknowledgment for establishing one base station according to a new pilot strength threshold value and then transmits the message (F1) to the base stations.

As the mobile station keeps moving successively, the mobile station generates a third new PSMM (F2) that requests an acknowledgment for establishing one base station according to another new pilot strength threshold value and then transmits the message (F2) to the base stations. After transmitting the message (F2), the mobile station drives the timer for the time ($T_{1m}$, for example, 400 ms). If an acknowledgment is not gained from any base station for the time ($T_{1m}$), the mobile station retransmits the message (R21) having the identical message sequence (MSG_SEQ) to the base stations.

On the other hand, in considering the above situation, according to the present invention, even when the retransmission of the PSMM (R01) having the same message sequence (MSG_SEQ[0]) as the first PSMM (F0) does not draw an acknowledgment from the corresponding base station, the mobile station does neither generate another retransmitting message having the same message sequence (MSG_SEQ[0]) as the first PSMM (F0) nor retransmit to the base stations because the more recent PSMM (F1) than the PSMM (F0) has been generated.

Furthermore, even when the second PSMM (F1) not draw an acknowledgement from the corresponding base station, the mobile station does not retransmit a message having the same message sequence (MSG_SEQ[1]) as the second PSMM (F1) to the base stations. The reason is that the more recent PSMM (F2) than the second PSMM (F1) has been generated.

In other words, when the mobile station moves between base stations, if a new PSMM is generated, a message having the same message sequence (MSG_SEQ[1]) as the PSMM prior to the new PSMM is not retransmitted to the base stations.

Figure 5:
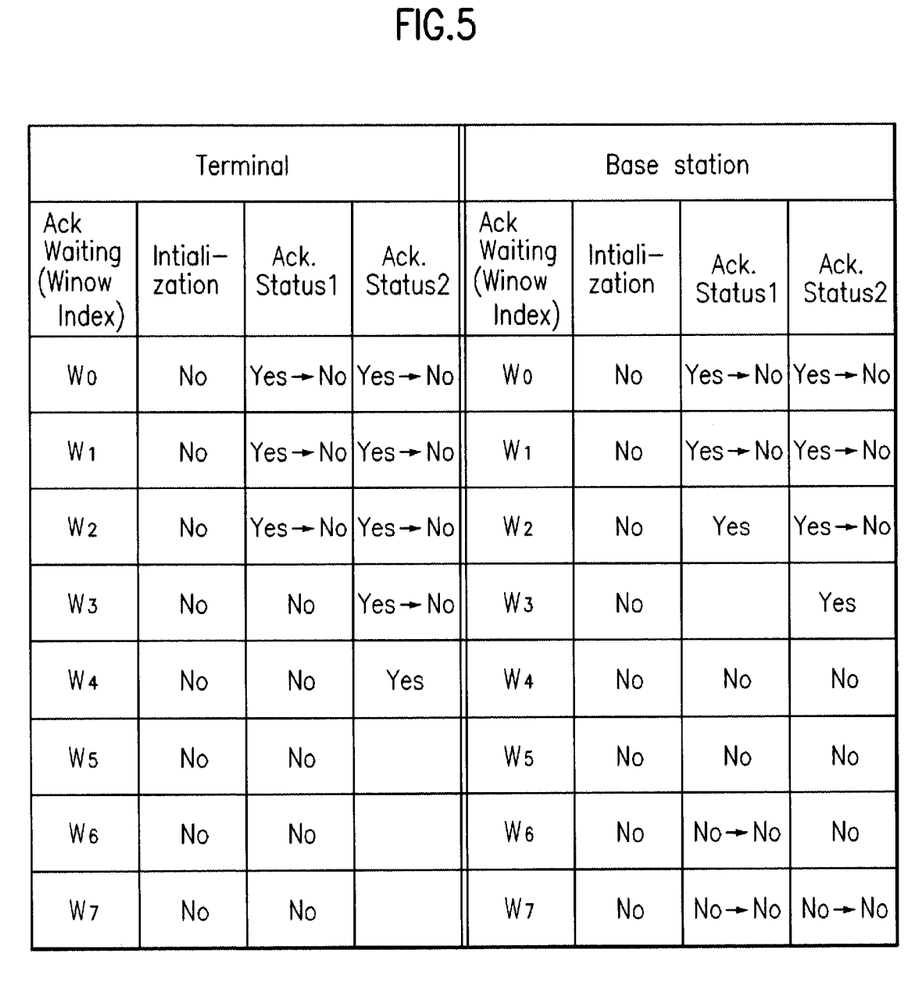
FIG. 5 is a diagram showing the states of the window indexes of the mobile station and base station when the method according to the present invention is executed.

In FIG. 3, since the third PSMM (F2) is the most recent PSMM, in order to gain the acknowledgment from the corresponding base station, a message (R21) having the same message sequence (MSG_SEQ[2]) as the third PSMM (F2) is transmitted to the base stations. As shown in FIG. 3, if the mobile station gains an acknowledgment (A2) in response to the third PSMM (F2) from one base station, any message having the same message sequence (MSG_SEQ[2]) as the third PSMM (F2) is not generated. When gaining the acknowledgment in response to the third PSMM (F2) from the corresponding base station, the mobile station sets NO to all the states of ACK_WAITINGs[ ] that are displayed on the window indexes (W0, W1, W2), as shown in ACK_STATUS 1 in FIG. 5, and therefore clears all the information. If the fourth most recent PSMM is generated, the states of ACK_WAITINGs are set with YES and the same procedure described above is executed. On the other hand, in the present invention, the base station has the same window as the mobile station, as shown in FIG. 5. The window clear in the base station during the state transition of MSG_SEQ_RCVDs[MSG_SEQr] is done according to the same procedure as the mobile station. This is explained in detail later.

Here, the maximum retransmitting number of the most recent PSMM is limited.

In the exemplary embodiment of the present invention, the maximum retry count number ($N_{1m}$) that is the number of the PSMMs being transmitted until the acknowledgment for a handoff is gained is limited. In other words, if a retry count number exceeds this maximum retry count number ($N_{1m}$), the acknowledgment failure is declared and the corresponding call is dropped.

As the mobile station moves, whenever the pilot strength of the mobile station exceeds the upper threshold value (T_Add) or is lower than the lower threshold value (T_Drop) and then the drop timer expires, a new PSMM is generated. While there is no acknowledgment in response to each new PSMM from a corresponding base station, the corresponding PSMM is retransmitted repeatedly to the base stations within the times of maximum retry count number ($N_{1m}$).

Figure 4:
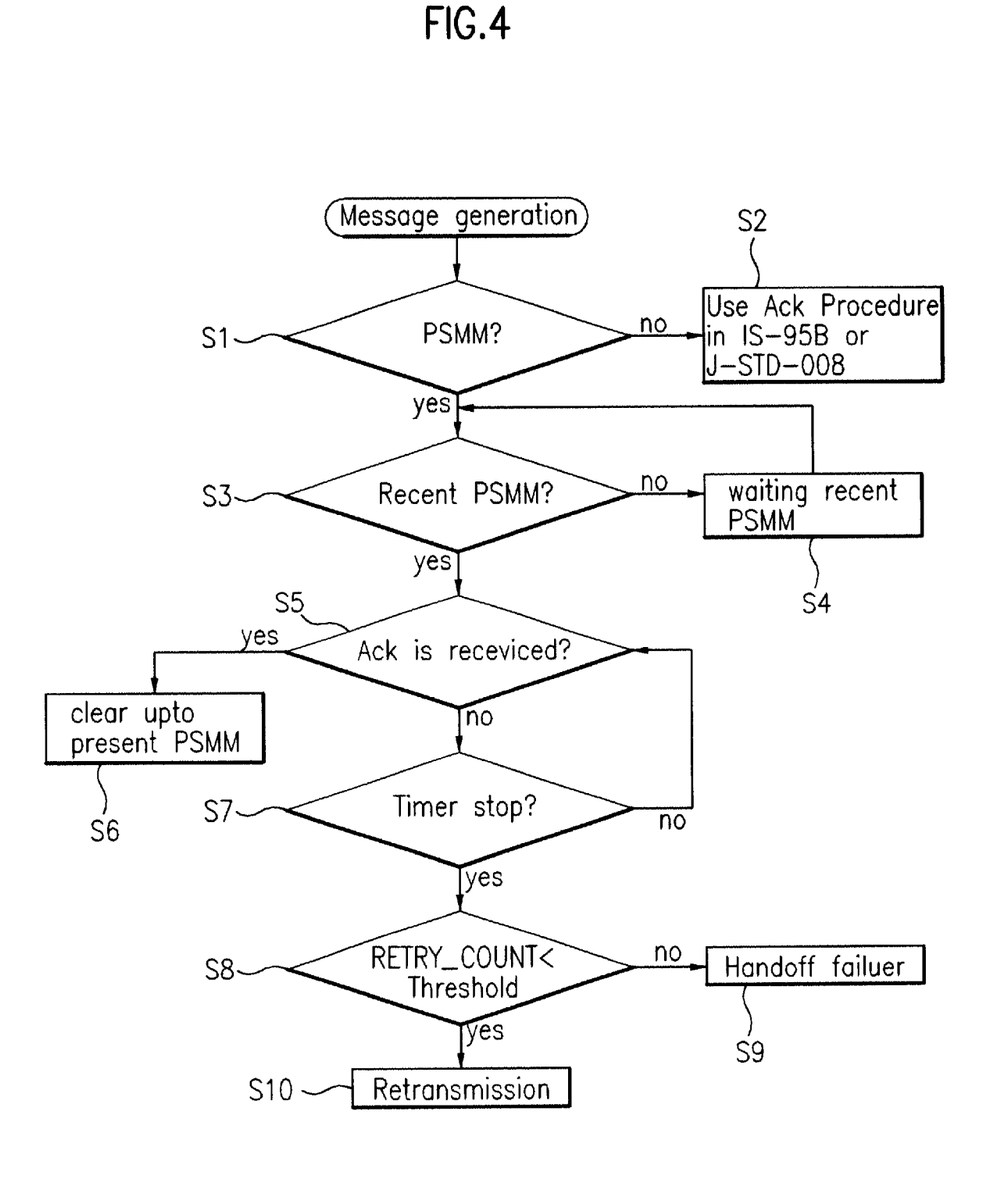
FIG. 4 is a flow chart showing the process for processing the PSMM at the mobile station according to the present invention.

FIG. 4 is a flow chart showing the transmission method of the PSMM of the mobile station according to the present invention. FIG. 5 is a diagram showing the relationship between the acknowledgment status of the base station and the mobile station.

First, if a message is generated, the mobile station decides whether the message is the PSMM (S1).

According to the result of S1, if the message is not the PSMM, the mobile station executes the process for the other message except the PSMM depending on the IS-95B or J-STD-008 (S2).

However, as the result of S1, if the message is the PSMM, the mobile station decides whether the message is the most recent PSMM (S3).

As the result of S3, if the PSMM is not the most recent one, the mobile station waits the most recent PSMM (S4).

As the result of S3, if the PSMM is the most recent one, the mobile station decides whether the acknowledgment is gained from the base station (S5).

As the result of S5, if the mobile station gains the acknowledgment in response to the PSMM from the base station, the mobile station sets NO to all ACK_WAITING[ ] of the PSMMs generated till now including the most recent PSMM that is indicated on its acknowledgment status indicator and clears them (S6).

As shown in the ACK_STATUS 2 in FIG. 5, the mobile station stores the acknowledgment status of the PSMMs from the first to the fourth in ACK_WAITINGs[MSG_SEQ_ACKs]. If a fifth PSMM is generated under the condition that any acknowledgment in response to the four PSMMs has not yet gained from the base station, the mobile station, to secure the existing IS-95B and a backward compatibility, decides the transmission of the fifth PSMM according to ACK_WAITINGs[(MSG_SEQ_ACKs+4) mod 8]. Therefore, since ACK_WAITINGs[0] is YES, the mobile station does not transmit the fifth PSMM to the base station and waits the response for the existing message.

If the response to the fourth PSMM is received, the corresponding window index (W3) is set with NO and the window index concerned with the PSMM among the previous window indexes (W0, W1, W2) is set with NO so that the window is cleared.

On the other hand, as shown in FIG. 5, the base station has MSG_SEQ_RCVDs[n], where n is 0 to 7, that is a received status indicator for a duplicate message detection. If a message requesting an acknowledgment that has the message sequence number (MSG_SEQr) is received and the state of MSG_SEQ_RCVDs[MSG_SEQr] is NO, the received message is processed as a new message. After processing, MSG_SEQ_RCVDs[MSG_SEQr] is set with YES and MSG_SEQ_RCVDs[(4+MSG_SEQr)mod 8] is set with NO. If MSG_SEQ_RCVDs[MSG_SEQr] is YES, it is decided that the message is a duplicate. The base station also takes the same window clear procedure for the PSMM as the mobile station. In other words, if the base station receives the PSMM having MSG_SEQr, MSG_SEQ_RCVDs[MSG_SEQr] is set with YES and MSG_SEQ_RCVDs[(4+MSG_SEQr)mod 8] is set with NO.

Even though the state of the received status indicator concerned with PSMM among previous four MSG_SEQ_RCVDs windows including MSG_SEQ_RCVDs[MSG_SEQr] is set with YES, since the most recent PSMM is received, changing the state to NO clears the previous PSMM state. According to the above example, four PSMMs to have IS-95B and backward compatibility may be simultaneously processed by window control. However, the three PSMMs except the most recent PSMM are unnecessary. Therefore, as another example, when the most recent PSMM is generated, the information about the previously generated PSMMs may be cleared on the status indicator window of the base station and the mobile station regardless of the acknowledgment from the base station.

On the other hand, referring to FIG. 4, if an acknowledgment in response to the most recent PSMM is not gained from the base station, whether or not the drop timer expires is decided (S7). As the result of S7, if the drop timer does not expire, it is decided again whether an acknowledgment in response to the most recent PSMM is gained from the base station (S5). As the result of S7, if the drop timer expires, it is decided whether the retry count number is less than a threshold value (or a maximum retry Count number) ($N_{1m}$) (S8).

As the result of S8, if the retry count number is larger than the threshold number ($N_{1m}$), the mobile station fails the message communication with the base station and takes a dropping process on the call (S9).

However, as the result of S8, if the retry count number does not exceed the threshold number ($N_{1m}$), the mobile station retransmits the most recent PSMM to the base station to gain an acknowledgment from the base station (S10).

Figure 6:
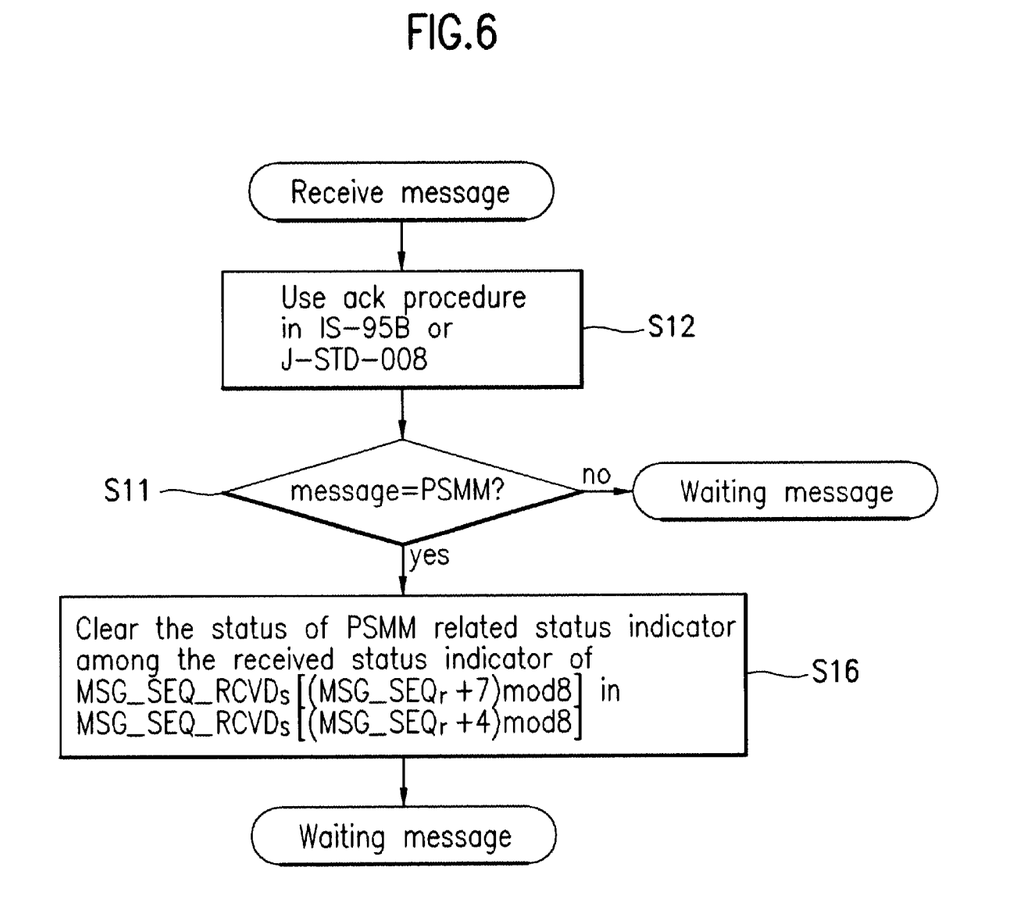
FIG. 6 is a flow chart showing the process for processing the PSMM at the base station according to the present invention.

FIG. 6 is a flow chart to explain a method for receiving a PSMM at the base station. As shown in FIG. 6, the PSMM receiving procedure at the base station is almost the same as the mobile station. First, if a message is received from the mobile station, the base station executes the acknowledgment of the existing IS-95B (S12) and checks whether the message is a PSMM (S11).

If the message received from the mobile station is the PSMM, the base station clears all the states of the previous PSMMs among the four windows prior to the corresponding PSMM (S16). After then, the base station returns to the message receiving process.

According to the improved method for transmitting PSMM of the present invention, the following effects may be obtained.

First, the mobile station waits an acknowledgment from the base station in response only to the most recent PSMM. On the other hand, the mobile station does not retransmit repeatedly the PSMM to the base station in order to gain the acknowledgment from the base station. Therefore, the quality deterioration of a wireless communication caused by unnecessary signaling is eliminated.

Second, the method according to the present invention reduces the unnecessary retry count number and protects the retry count number from exceeding the maximum retry count number. Therefore, the probability of call drops of the mobile station is lowered and the reliability to the user is improved.

Third, the method according to the present invention is implemented by considering the existing communication services, such as IS-95B and J-SJD-008. Therefore, the backward compatibility with the existing communication services is maintained.

It will be apparent to those skilled in the art that various modifications and variations can be made in the handoff control method according to the present invention without departing from the spirit or scope of the invention. Thus, it is intended that the present invention covers the modifications and variations of this invention provided they come within the scope of the appended claims and their equivalents.

What is claimed is:

1. An improved method for transmitting a pilot strength measurement message (PSMM) in a mobile communication system, comprising:
   checking through a mobile station whether a message generated by the mobile station is a PSMM;
   deciding by the mobile station whether or not said generated PSMM is the most recent PSMM when said generated message is the PSMM;
   transmitting the generated PSMM from the mobile station to a base station, as a result of said step of deciding, when the generated PSMM is the most recent PSMM, in order to gain an acknowledgment from a base station; and
   clearing a previous PSMM when the generated PSMM is the most recent PSMM if no acknowledgment message is received for the previous PSMM.

2. The method claimed in claim 1, wherein the most recent PSMM is the most recently generated PSMM among the PSMMs that have been already generated but have not yet been acknowledged by the base station or is a PSMM newly generated by the mobile station.

3. The method claimed in claim 1, further comprising:
   a wait step that if said PSMM is not the most recent PSMM, said mobile station waits for the most recent PSMM;
   a clear step that if the PSMM is the most recent PSMM and an acknowledgment in response to the most recent PSMM is received from the base station, said mobile station clears all the PSMMs including the most recent PSMM; and
   a retransmitting step that if the PSMM is the most recent PSMM and an acknowledgment in response to the most recent PSMM is not received from the base station, said mobile station retransmits repeatedly the most recent PSMM to the base station up to a maximum retry count number until an acknowledgment is received from the base station and maintains the remaining previous PSMMs as they were.

4. The method claimed in claim in 3, wherein the maximum retry count number is $N_{1m}$.

5. The method claimed in claim 1, further comprising:
   waiting for the most recent PSMM if the PSMM is not the most recent PSMM;
   if the PSMM is the most recent PSMM and an acknowledgment in response to the most recent PSMM is received from the base station, clearing all the PSMMs including the most recent PSMM; and
   if the PSMM is the most recent PSMM and an acknowledgment in response to the most recent PSMM is not received from the base station, repeatedly retransmitting the most recent PSMM to the base station up to a maximum retry count number and clearing all the remaining previous PSMMs regardless of the acknowledgment from the base station.

6. The method claimed in claim 5, wherein the maximum retry count number is $N_{1m}$.

7. The method of claim 1, further comprising storing information about each most recent PSMM in half of a N window status indicator in sequence and determining whether an acknowledgment in response to the most recent PSMM is received from the base station.

8. The method of claim 7, further comprising clearing the information about the most recent PSMM and all other PSMMs in the N/2 windows when the acknowledgment in response to the most recent PSMM is received from the base station.

9. The method of claim 7, further comprising retransmitting the most recent PSMM to the base station repeatedly for a prescribed number of times and maintaining all the other PSMMs in the N/2 windows as they were if the acknowledgment in response to the most recent PSMM is not received from the base station.

10. The method of claim 1, wherein the most recent PSMM is transmitted in a system traffic state.

11. An improved method for transmitting a pilot strength measurement message (PSMM) in a communication system, comprising:
    checking through a mobile station whether a message generated by the mobile station including N message sequence numbers and status indicator is a PSMM;
    if said message is the PSMM, deciding whether the PSMM is the most recent PSMM;
    as a result of said deciding step, whenever the PSMM is generated, storing information about each most recent PSMM in a half of a N window status indicator in sequence and checking whether an acknowledgment in response to the most recent PSMM is gained from the base station;
    when an acknowledgment in response to said most recent PSMM is gained from the base station, clearing the information about all the PSMMs in the half of the N window status indicator including the most recent PSMM; and
    if the acknowledgment in response to the most recent PSMM is not gained from the base station, retransmitting the most recent PSMM to the base station repeatedly within the times of a maximum retry count number and maintaining all the other PSMMs in the half of the N window status indicator as they were.

12. The method claimed in claim 11, wherein the information about the most recent PSMM includes the message sequence number of the most recent PSMM and includes the information about the acknowledgment in response to the most recent PSMM from the base station.

13. The method claimed in claim 11, wherein N is 8.

14. The method claimed in claim 11, further comprising the step that when said most recent PSMM exceeds said N/2 windows, said mobile station clears all the PSMMs designated previously in the N/2 windows.

15. The method claimed in claim 11, wherein said maximum retry count number is $N_{1m}$.

16. The method claimed in claim 11, further comprising:
    when an acknowledgment in response to said most recent PSMM is not gained from the base station, retransmitting the most recent PSMM to the base station repeatedly within the times of a maximum retry count number; and
    clearing all the remaining PSMMs in said N/2 windows.

17. The method claimed in claim 16, wherein said maximum retry count number is $N_{1m}$.

18. The method claimed in claim 11, further comprising:
    establishing N received status indicators in said base station, whose number is the same as that of the mobile station; and
    storing and clearing the information of said PSMMs in the same way as the window of said mobile station.

19. The method claimed in claim 18, wherein N is 8.

20. a method for transmitting a pilot strength measurement message (PSMM) in a mobile communication system, comprising:
    determining whether a message generated by the mobile station is a PSMM;

determining whether or not the generated PSMM is the most recent PSMM when the generated message is the PSMM;

waiting for the most recent PSMM if the PSMM is not the most recent PSMM;

repeatedly retransmitting the most recent PSMM to the base station for a prescribed number of times if the PSMM is the most recent PSMM and an acknowledgment in response to the most recent PSMM is not received from the base station, and clearing all the remaining previous PSMMs regardless of the acknowledgment from the base station; and clearing the most recent PSMM and all the remaining previous PSMMs if the PSMM is the most recent PSMM and an acknowledgment in response to the most recent PSMM is received from the base station, wherein the PSMM is determined to be the most recent PSMM if it is the most recently generated PSMM among the PSMMs that have been already generated but have not yet been responded by the base station or it is a PSMM newly generated by said mobile station.

21. The method of claim 20, further comprising storing information about each most recent PSMM in half of N windows status indicator in sequence and determining whether an acknowledgment in response to the most recent PSMM is received from the base station.

22. The method of claim 21, further comprising clearing the information about the most recent PSMM and all other PSMMs in the half N windows when the acknowledgment in response to the most recent PSMM is received from the base station.

23. The method of claim 21, further comprising retransmitting the most recent PSMM to the base station repeatedly for a prescribed number of times and maintaining all the other PSMMs in the half N windows as they were if the acknowledgment in response to the most recent PSMM is not received from the base station.

24. The method of claim 21, wherein the information about the most recent PSMM includes a message sequence number of the most recent PSMM and information regarding the acknowledgment in response to the most recent PSMM from the base station.

25. The method of claim 21, wherein N is 8.

26. The method of claim 21, wherein the mobile station clears all the PSMMs designated previously in the N/2 windows when the most recent PSMM exceeds N/2 windows.

27. The method of claim 21, further comprising:

repeatedly retransmitting the most recent PSMM to the base station for a prescribed number of times when an acknowledgment in response to said most recent PSMM is not gained from the base station; and clearing all the remaining PSMMs in the N/2 windows.

28. The method claimed in claim 21, further comprising:

establishing N received status indicators in the base station; and storing and clearing the information of the PSMMs in the same way as the window of said mobile station.

29. The method of claim 20, wherein all previous PSMMs are cleared.

30. The method of claim 20, wherein the most recent PSMM and the at least one previous PSMM each have a unique message sequence number.

* * * * *